United States Patent
Yakamavich, Jr.

[11] Patent Number: 6,019,553
[45] Date of Patent: Feb. 1, 2000

[54] METAL CUTTING DRILL WITH INSERT HAVING RADIALLY OVERLAPPING CUTTING EDGES

[75] Inventor: Anthony Yakamavich, Jr., Glenwood, N.J.

[73] Assignee: Sandvik, Inc., Fair Lawn, N.J.

[21] Appl. No.: 09/115,636

[22] Filed: Jul. 15, 1998

[51] Int. Cl.<sup>7</sup> ................................................. B23B 51/00
[52] U.S. Cl. ............................................ 408/224; 403/199
[58] Field of Search .................................. 408/223, 224, 408/227, 229, 199

[56] References Cited

U.S. PATENT DOCUMENTS

| | | | |
|---|---|---|---|
| 4,120,601 | 10/1978 | Benjamin . | |
| 4,149,821 | 4/1979 | Faber | 408/199 |
| 4,293,252 | 10/1981 | Kress et al. | 408/224 |
| 4,618,296 | 10/1986 | Allaire et al. | 408/224 |
| 4,620,822 | 11/1986 | Haque et al. . | |
| 4,648,760 | 3/1987 | Karlsson et al. | 408/223 |
| 4,844,670 | 7/1989 | Heule . | |
| 4,889,455 | 12/1989 | Karlsson et al. . | |
| 5,112,167 | 5/1992 | Shiga et al. . | |
| 5,232,320 | 8/1993 | Tank et al. . | |
| 5,314,272 | 5/1994 | Kubota . | |
| 5,340,246 | 8/1994 | Tukala . | |
| 5,423,640 | 6/1995 | Lindblom et al. | 408/227 |
| 5,860,773 | 1/1999 | Blomberg et al. | 408/83 |

*Primary Examiner*—Andrea L. Pitts
*Assistant Examiner*—Adesh Bhargava
*Attorney, Agent, or Firm*—Burns, Doane, Swecker & Mathis, L.L.P.

[57] ABSTRACT

A metal cutting drill includes a steel drill body, and a carbide insert brazed therein. The drill body includes a front face having a recess formed therein, the recess radially overlapping a longitudinal axis of the drill body. The insert is brazed in the recess and includes a plurality of spaced-apart cutting edges disposed on opposite sides of the axis. The cutting edges radially overlap during a drilling operation. One of the cutting edges projects radially outwardly beyond a side face of the head, and another of the cutting edges terminates radially inwardly of the side face.

12 Claims, 3 Drawing Sheets

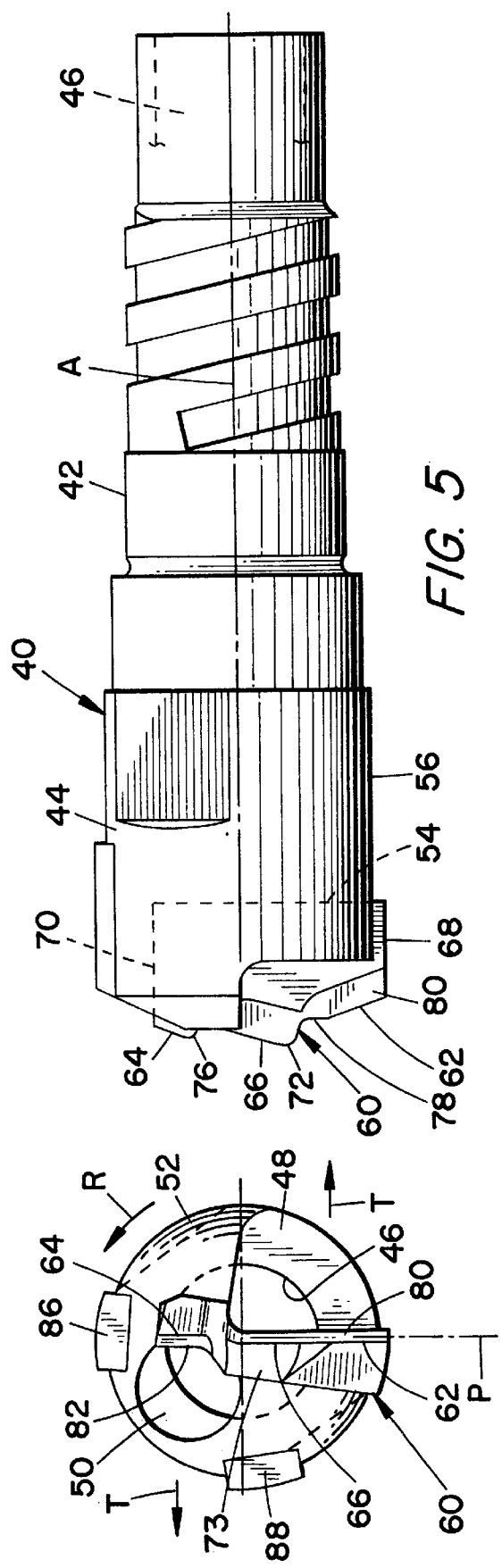

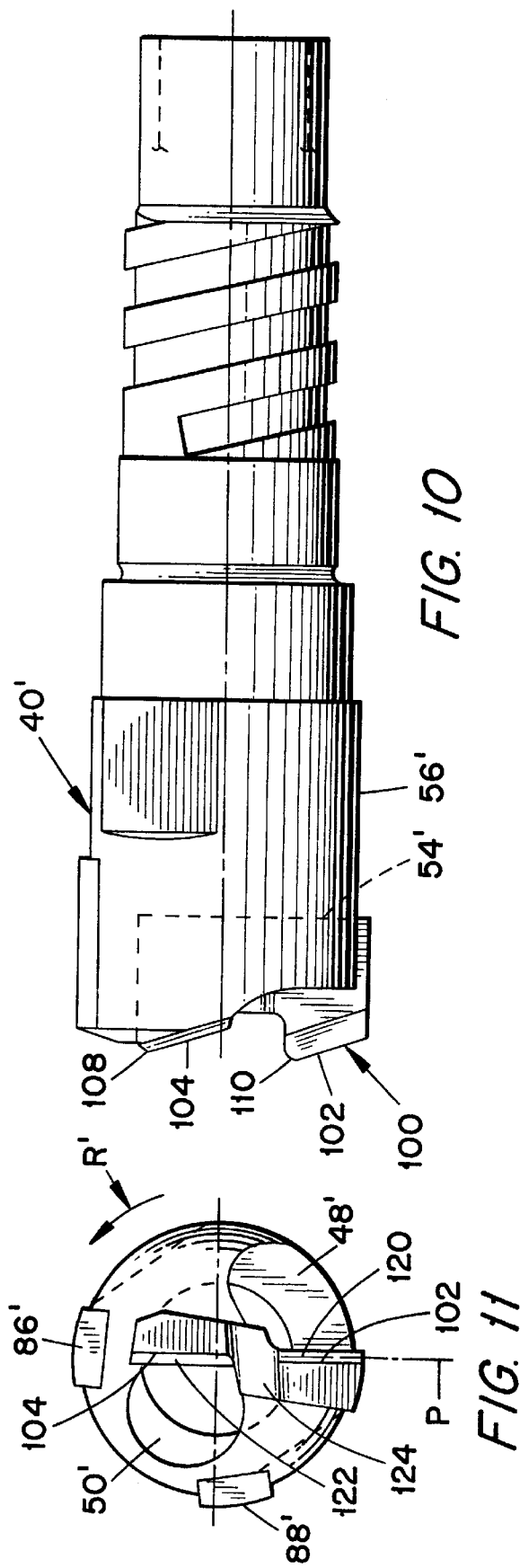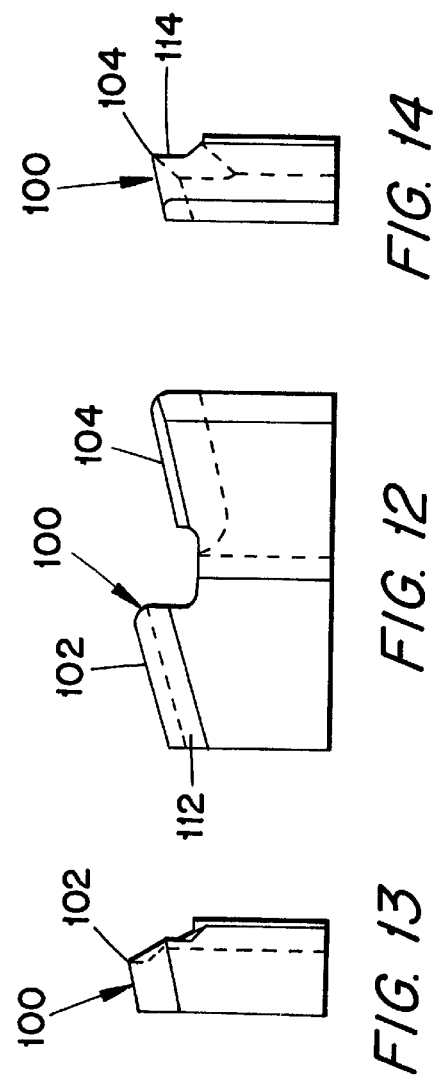

ര6,019,553

METAL CUTTING DRILL WITH INSERT HAVING RADIALLY OVERLAPPING CUTTING EDGES

BACKGROUND OF THE INVENTION

The present invention relates to a drill and a cutting insert adapted for use in metal cutting.

A conventional drill 10 depicted in FIGS. 1 and 2 includes a steel body having a hollow shank 12 and a head 14 disposed at a front end thereof. The shank 12 has a central passageway 16 extending axially forwardly from a rear end of the shank and communicating with a pair of throats 18, 20 formed in a front face 22 of the head 14. Brazed in recesses formed in the front face are three carbide cutting inserts 24, 26, 28, two of which 24 and 26 are arranged at the throat 18. The third insert 28 is arranged at the throat 20. The inserts form respective cutting edges 24A, 26A, 28A that are arranged substantially on a diametrical line as viewed in FIG. 2. The cutting edges overlap radially during drill rotation, so that together they cut a bore. Chips that are cat become entrained in cooling liquid conducted forwardly through the central passageway 16 and the throats 18, 20 and are exhausted rearwardly within a gap formed between the drill and the wall of the bore being drilled. A pair of guide pads 30, 32 is provided in a side wall of the head 14 to guide the drill.

Another prior art drill 10' is depicted in FIGS. 3 and 4 wherein only two inserts 24' and 28' are employed. Such a drill may be employed to drill smaller bores than the drill of FIGS. 1–2.

During operation of the above-described drills, a drilling, operation produces a chip flow which tends to wear away portions of the front face of the steel head 14 situated between the cutting inserts, i.e., the portions 30A, 32A shown in FIG. 2 and the portion 30' shown in FIG. 4. The portion 30' shown in FIG. 4 seems, in practice, to be particularly susceptible to such wear. Eventually, erosion of the steel body can lead to a collapsing of the drill.

It would, therefore, be desirable to eliminate such a tendency for the drill to erode and collapse.

SUMMARY OF THE INVENTION

The invention relates to a metal cutting drill comprising a drill body and an insert brazed thereto. The drill body includes a shank, and a head disposed at a forward end of the shank. A passageway extends longitudinally forwardly through the shank and is connected to throats extending rearwardly from a front face of the head. A recess is formed in the front face, the recess overlapping a longitudinal axis of the drill body. The insert is formed of a harder material than the drill body (e.g., carbide). The insert is brazed in the recess and forms a plurality of spaced-apart cutting edges disposed on opposite sides of the axis and situated circumferentially behind respective ones of the throats. The cutting edges overlap each other radially during a drilling operation. One of the cutting edges projects radially outwardly beyond a side face of the head, and another of the cutting edges terminates radially inwardly of the side face.

If there is a total of two cutting edges on the insert, those cutting edges are situated adjacent respective ones of two throats.

If there is a total of three cutting edges on the insert, two of the cutting edges are disposed adjacent one throat, and the third cutting edge is situated adjacent another throat.

The invention also relates to a cutting insert per se which is adapted for use in a metal cutting drill. The insert comprises a carbide body having oppositely facing sides, and a front surface. Each side is beveled adjacent the front surface whereby an intersection between a first of the bevels and the front surface forms at least one cutting edge facing in a first direction. An intersection between a second of the bevels and the front surface forms a second cutting edge facing in a second direction opposite to the first direction. The first and second bevels are intersected by a common plane passing through the front surface in a direction parallel to the cutting edges.

BRIEF DESCRIPTION OF THE DRAWING

The objects and advantages of the invention will become apparent from the following detailed description of preferred embodiments thereof in connection with the accompanying drawing in which like numerals designate like elements and in which:

FIG. 5 is a side elevational view of a drill according to a first embodiment of the invention;

FIG. 6 is a front view of the drill depicted in FIG. 5;

FIG. 7 is a side view of a cutting insert employed in the drill depicted in FIG. 5;

FIG. 8 is an end view of the insert depicted in FIG. 7;

FIG. 9 is another end view of the insert depicted in FIG. 7;

FIG. 10 is a side elevational view of a drill according to a second embodiment of the invention;

FIG. 11 is a front view of the drill depicted in FIG. 10;

FIG. 12 is a side view of a cutting insert utilized in the drill depicted in FIG. 10;

FIG. 13 is an end view of the insert depicted in FIG. 12; and

FIG. 14 is another end view of the insert depicted in FIG. 12.

DETAILED DESCRIPTION OF PREFERRED EMBODIMENTS OF THE INVENTION

Figure 1:
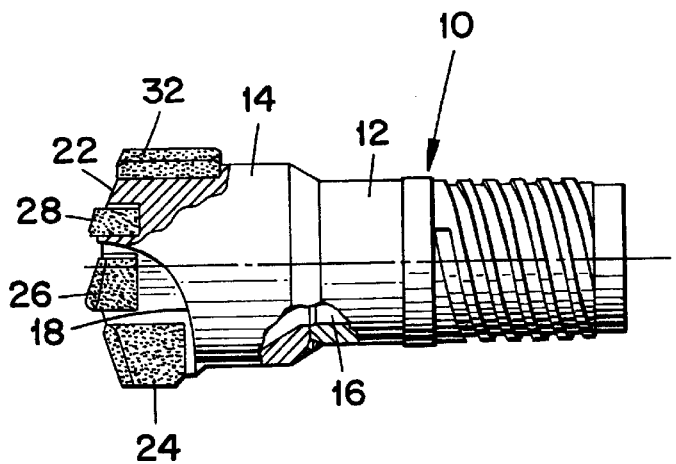
FIG. 1 is a side elevational view, with parts broken away, of a conventional metal cutting drill.
Figure 2:
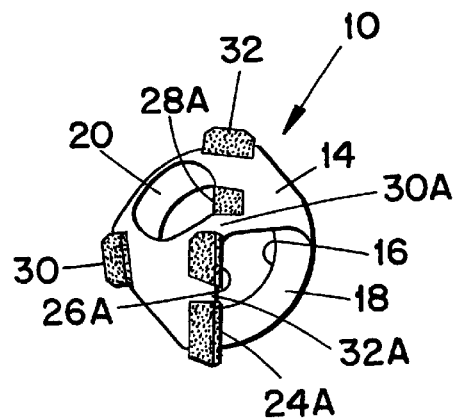
FIG. 2 is a front view of the drill depicted in FIG. 1.
Figure 3:
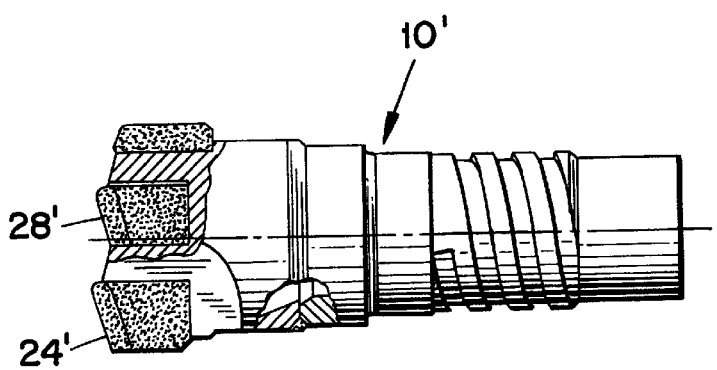
FIG. 3 is a side elevational view, with parts broken away, of another conventional metal cutting drill.
Figure 4:
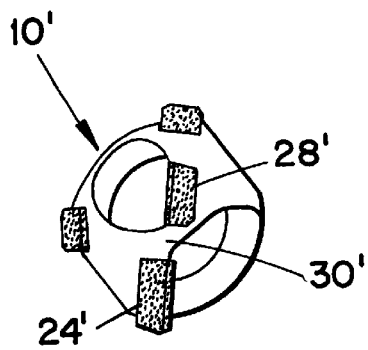
FIG. 4 is a front view of the drill depicted in FIG. 3.

A drill 40 includes a steel drill body similar to that described in connection with FIGS. 1–4 in that the drill body includes a hollow shank 42 and a head 44 disposed at a front end thereof. The shank has a central coolant passageway 46 extending axially forwardly from a rear end of the shank and communicating with a pair of large and small throats 48, 50 that converge rearwardly from a front face 52 of the head 44.

A cutting insert 60, which is brazed in a recess 54 formed in the front face 52, includes a body formed of a harder material than the steel drill body, e.g., carbide. The insert body is slightly longer than the recess 54 in the radial direction of the drill, whereby a radial outer edge 68 of the insert projects radially outwardly beyond a side face 56 of the head 44. A radially inner edge 70 of the insert is spaced radially inwardly from the side face 56 on an opposite side of a central axis A of the drill from the outer edge 68. Thus, the insert overlaps the axis A.

The insert includes three spaced-apart cutting edges, namely, a radially outer cutting edge 62, a radially inner cutting edge 64 and a central cutting edge 66. The insert includes a pair of opposing sides 69, 71 and a front surface 73. Portions 80, 82 of the sides located adjacent the front surface 73 are beveled whereby two of the spaced-apart cutting edges 62, 66 are formed by an intersection of the bevel 80 and the front surface 73, and the third spaced-apart cutting edge 64 is formed by an intersection of the other bevel 82 and the front surface 73. That cutting edge 64 faces in a tangential direction T opposite to the tangential direction T' in which the cutting edges 62, 66 face. Both of the bevels 80, 82 are intersected by a common plane P which passes through the front surface 73 in a direction substantially parallel to the cutting edges 62, 64, 66. The cutting edges 64 and 66 extend generally parallel to one another, as can be seen in FIG. 7. The outer and inner cutting edges 62, 64 are flared longitudinally rearwardly and radially outwardly (i.e. away from the axis A as the insert is viewed in profile—see FIG. 5). The center cutting edge 66 is flared longitudinally rearwardly and radially inwardly (i.e., toward the axis A). The center cutting edge 66 radially overlaps the axis A.

The forward end 72 of the center edge 66 is situated farther forwardly than the forwardmost points of either of the other edges 62, 64 as can be seen in FIG. 5. The forward end 76 of the inner edge 64 is situated farther forwardly than the forwardmost point on the outer edge 62. During a cutting operation, the inner edge 64 radially overlaps a region 78 disposed between the outer and center edges 62, 66, whereby the three cutting edges cooperate to cut an entire diameter of a bore.

The outer and center edges 62, 66 are situated circumferentially behind the large throat 48 with reference to the direction of drilling R, whereas the inner edge 64 is situated circumferentially behind the small throat 50. Thus, chips cut by the edges 62, 66 are flushed by fluid exiting the throat 48, and chips cut by the edge 64 are flushed by fluid exiting the throat 50. The bevels 80, 82 function as chip-guiding surfaces.

Two guide pads 86, 88 are provided on the side surface 56 to guide the drill, as is conventional.

By forming all three cutting edges 62, 64, 66 on a single insert, there is no exposed portion of the front face to be subjected to a vigorous eroding action by chips, as is the case when separate spaced-apart inserts are employed. Consequently, the overall strength of the drill body is increased for withstanding radial and tangential cutting forces, thereby increasing the life of the drill.

A second preferred embodiment of the invention is depicted in FIGS. 10–14 which would be expected to cut smaller-diameter bores than the drill according to FIGS. 5–9. That second embodiment includes a drill 40' generally similar to the earlier described drill 40', and which includes two throats 48', 50'. Mounted in a recess 54' of the drill body is a cutting insert 100 which forms only two cutting edges 102, 104, namely a radially outer cutting edge 102 and a radially inner cutting edge 104. Those cutting edges are formed by the intersections of bevels 120, 122 with a front surface 124. The cutting edges 102, 104 extend generally parallel to one another as can be seen in FIG. 12. Those bevels 120, 122 lie in a common plane P which passes through the front surface 124 in a direction parallel to the cutting edges 102, 104. The outer cutting edge 102 is flared longitudinally rearwardly and radially outwardly. The inner cutting edge 104 is flared longitudinally rearwardly and radially inwardly. The inner cutting edge 104 radially overlaps the axis A.

The radially inner end 110 of the outer cutting edge 102 is situated longitudinally forwardly of the inner cutting edge 104. The outer cutting edge 104 projects radially beyond a side face 56' of the drill body, and the outer end 108 of the inner cutting edge radially overlaps the cutting path of the outer cutting edge during a drilling operation, so the two cutting edges 102, 104 together form the diameter of the hole being drilled.

The cutting edges 102, 104 are situated circumferentially behind the throats 48', 50', respectively, with reference to the direction of drilling R. Thus, chip cut by the edges 102, 104 are flushed by fluid exiting the throats 48', 50', respectively.

Bevel portions 120, 122 of the insert body situated longitudinally rearwardly of the respective cutting edges 102, 104 are flared longitudinally rearwardly and circumferentially forwardly to serve as chip faces.

In sum, by forming both cutting edges on a single insert, there is no exposed portion of the front face which is subjected to a vigorous eroding action by cut chips. Consequently, the overall strength of the drill body is increased for withstanding radial and tangential forces, thereby increasing the life of the drill.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A metal cutting drill comprising:
   a drill body including a shank and a head disposed at forward end of the shank, a passageway extending longitudinally forwardly through the shank and connected to a pair of throats extending rearwardly from a front face of the head, and a recess formed in the front face, the recess overlapping a longitudinal axis of the drill body; and
   an insert formed of a harder material than the drill body, the insert brazed in the recess and including a plurality of radially spaced-apart cutting edges disposed on opposite sides of the axis and situated circumferentially behind respective ones of the throats, the cutting edges forming between one another a gap spaced radially from the longitudinal axis, the cutting edges overlapping each other radially during a drilling operation, one of the cutting edges projecting radially outwardly beyond a side face of the head, and another of the cutting edges terminating radially inwardly of the side face a forward most point of each cutting edge being spaced from the axis, the cutting edges including cutting edges extending generally parallel to one another.

2. The drill according to claim 1 wherein there is a total of three cutting edges comprised of: a radially outer cutting edge disposed on one side of the axis and extending radially outwardly beyond the side face, a radially inward cutting edge disposed on an opposite side of the axis aid spaced entirely from the axis, and a center cutting edge disposed radially between the inner and outer cutting edges and radially overlapping the axis.

3. The drill according to claim 2 wherein the center cutting edge includes a longitudinally forward end situated farther forwardly than the outer and inner cutting edges.

4. The drill according to claim 3 wherein the inner cutting edge includes a longitudinally forward end situated farther forwardly than the outer cutting edge.

5. The drill according to claim 4 wherein the outer and inner cutting edges are flared longitudinally rearwardly and radially outwardly.

6. The drill according to claim wherein there is a total of two cutting edges comprising radially outer and inner cutting edges, respectively, the outer cutting edge extending radially outwardly beyond a side face of the head; the inner cutting edge radially overlapping the axis and including a radially outer end spaced radially inwardly from the side face.

7. The drill according to claim 6 wherein the outer cutting edge includes a radially inner end situated longitudinally forwardly of the inner cutting edge.

8. The drill according to claim 7 wherein the outer cutting edge is flared longitudinally rearwardly and radially outwardly; the inner cutting edge being flared longitudinally rearwardly and radially inwardly.

9. A cutting insert adapted for use in a metal cutting drill, the insert comprising a carbide body having oppositely facing sides, and a front surface; each side being beveled adjacent the front surface whereby an intersection between a first of the bevels and the front surface forms at least one cutting edge facing in a first tangential direction, and an intersection between a second of the bevels and the front surface forms a second cutting edge facing in a second tangential direction opposite to the first tangential direction; the first and second bevels being intersected by a common plane passing through the front surface in a direction parallel to the cutting edges, the first and second cutting edges being spaced radially apart from one another and extending generally parallel to one another.

10. The cutting insert according to claim 9 wherein the at least one cutting edge formed by the intersection between the first bevel and the front surface comprises two cutting edges.

11. A metal cutting drill comprising:
a drill body including a shank and a head disposed at a forward end of the shank, a passageway extending longitudinally forwardly through the shank and connected to a pair of throats extending rearwardly from a front face of the head, and a recess formed in the front face, the recess overlapping a longitudinal axis of the drill body; and
an insert formed of a harder material than the drill body, the insert brazed in the recess and including a plurality of spaced-apart cutting edges disposed on opposite sides of the axis and situated circumferentially behind respective ones of the throats, the cutting edges overlapping each other radially during a drilling operation, one of the cutting edges projecting radially outwardly beyond a side face of the head, and another of the cutting edges terminating radially inwardly of the side face;
wherein there is a total of three cutting edges comprised of: a radially outer cutting edge disposed on one side of the axis and extending radially outwardly beyond the side face, a radially inward cutting edge disposed on an opposite side of the axis and spaced entirely from the axis, and a center cutting edge disposed radially between the inner and outer cutting edges and radially overlapping the axis, wherein the center cutting edge includes a longitudinally forward end situated farther forwardly than the outer and inner cutting edges.

12. A metal cutting drill comprising:
a drill body including a shank and a head disposed at a forward end of the shank, a passageway extending longitudinally forwardly through the shank and connected to a pair of throats extending rearwardly from a front face of the head, and a recess formed in the front face, the recess overlapping a longitudinal axis of the drill body; and
an insert formed of a harder material than the drill body, the insert brazed in the recess and including a plurality of spaced-apart cutting edges disposed on opposite sides of the axis and situated circumferentially behind respective ones of the throats, the cutting edges overlapping each other radially during a drilling operation, one of the cutting edges projecting radially outwardly beyond a side face of the head, and another of the cutting edges terminating radially inwardly of the side face;
wherein there is a total of two cutting edges comprising radially outer and inner cutting edges, respectively, the outer cutting edge extending radially outwardly beyond a side face of the head; the inner cutting edge radially overlapping the axis and including a radially outer end spaced radially inwardly from the side face, wherein the outer cutting edge includes a radially inner end situated longitudinally forwardly of the inner cutting edge.

* * * * *